United States Patent [19]

Carlson

[11] Patent Number: 5,381,542
[45] Date of Patent: Jan. 10, 1995

[54] SYSTEM FOR SWITCHING BETWEEN A PLURALITY OF CLOCK SOURCES UPON DETECTION OF PHASE ALIGNMENT THEREOF AND DISABLING ALL OTHER CLOCK SOURCES

[75] Inventor: Robert H. Carlson, Laguna Niguel, Calif.

[73] Assignee: Unisys Corporation, Blue Bell, Pa.

[21] Appl. No.: 737,303

[22] Filed: Jul. 29, 1991

[51] Int. Cl.[6] .................................. G06F 1/04
[52] U.S. Cl. .................................. 395/550; 395/575;
371/9.1; 371/8.1; 364/270.3; 364/270.7;
364/270.5; 364/DIG. 1
[58] Field of Search .................. 395/550, 575;
364/270.7, 271.7; 328/72; 307/511, 269, 262;
331/2, 49; 371/9.1, 8.1

[56] References Cited

U.S. PATENT DOCUMENTS

| | | | |
|---|---|---|---|
| 4,490,581 | 12/1984 | Edwards et al. | 371/8 |
| 4,748,417 | 5/1988 | Spengler | 328/72 |
| 4,853,653 | 8/1989 | Maher | 331/49 |
| 4,882,738 | 11/1989 | Suzuki | 331/49 |
| 4,970,405 | 11/1990 | Hagiwara | 328/72 |
| 5,052,030 | 9/1991 | Ernst et al. | 331/49 |
| 5,099,141 | 3/1992 | Utsunomiya | 331/49 |
| 5,122,677 | 6/1992 | Sato | 307/269 |

Primary Examiner—Thomas C. Lee
Assistant Examiner—Sang Hui Kim
Attorney, Agent, or Firm—John J. McCormack; Mark T. Starr

[57] ABSTRACT

Systems allowing smooth, trouble-free, "transparent" switchover from a "Primary clock" to a "Secondary clock", with no loss of clock or essential pulse-width, and where the "Secondary clock" may be completely separate from, and independent of, the "Primary clock."

12 Claims, 6 Drawing Sheets

CLK BUFFER OUTPUT ENABLES

| DATA | ADDRESS | | | | | |
|---|---|---|---|---|---|---|
| | 0 | 1 | 2 | 3 | 4 | 5 |
| PRIMARY SELECT #1 | 0 | 1 | 1 | 0 | 0 | 0 |
| PRIMARY SELECT #2 | 0 | 0 | 0 HOLD UNTIL SWITCHOVER TO SEC. | 0 | 1 | 1 HOLD UNTIL SWITCHOVER TO PRIMARY |
| SWITCH EN #1 | 0 | 0 | 0 | 0 | 0 | 1 |
| SWITCH EN #2 | 0 | 0 | 1 | 0 | 0 | 0 |

FIG. 6

SYSTEM FOR SWITCHING BETWEEN A PLURALITY OF CLOCK SOURCES UPON DETECTION OF PHASE ALIGNMENT THEREOF AND DISABLING ALL OTHER CLOCK SOURCES

In present computer systems, a "halt load" condition typically results when one switches clock generation from one card to another. This typically corrupts the system, causing loss-of-memory (e.g. because related microprocessor etc. is unable to tolerate clock pulses which are stretched or foreshortened)—hence, loss of the application program being run (at the time of failure) and causes system "down-time" because of the "halt load". An example is the arrangement in FIG. 1, with clock-cards #1B, 1B' coupled to switchover circuit 1A.

This invention allows switchover of system clock generation and distribution: from a primary card to a secondary (back-up) card, with no loss of clock and essential pulse-width requirements maintained, giving a switchover which is "transparent" to the system.

This invention also provides a system designed so that loss of power on one clock-generating card (CGC) does not disturb the (connected) circuit operation of a companion CGC.

As a supplemental feature, this invention teaches the possible use of micro-controller means to control such "Dynamic Clock Switch-over", using a clock source which is separate from the system clock, and is independent.

Workers have for some time been concerned with the problem of switching from one clock source to another [e.g. see U.S. Pat. No. 4,853,653 to Maher for "Multiple Input Clock Selector", but this system must be "halted" before switching clocks; whereupon pulse width is stretched for several clock cycles to avoid generation of short ("runt") pulses such is not acceptable for systems using a microprocessor, as with this invention, where pulse-width requirements must be maintained.] Also, this invention allows the use of asynchronous clocks, with no analogous problems of stability or anomalous ("runt") signals.

BRIEF DESCRIPTION OF DRAWINGS

For a more complete understanding of this invention and further features and advantages thereof, reference should be made to the following, in conjunction with the accompanying drawings, in which:

FIGS. 4A, 4B are a more detailed logic circuit of a preferred embodiment of the system of FIG. 2; while FIG. 6 shows the associated command sequence.

DESCRIPTION OF PREFERRED EMBODIMENT

Figure 1:
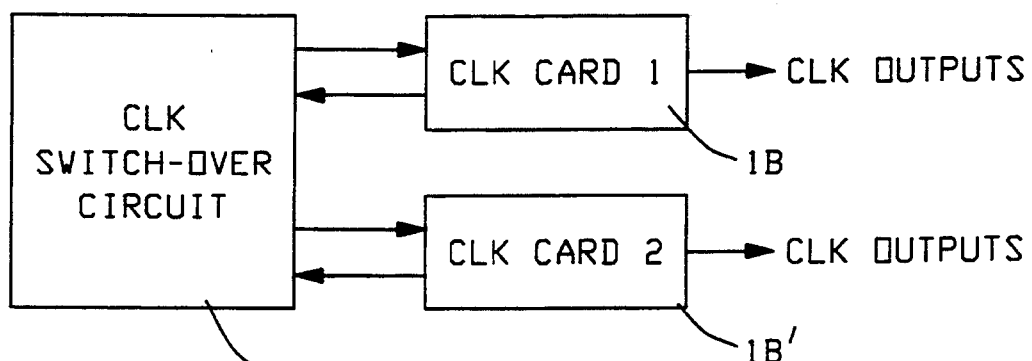
FIG. 1 is a block diagram of a general clock switchover system that allows switch-over, but only in one direct ion.
Figure 2:
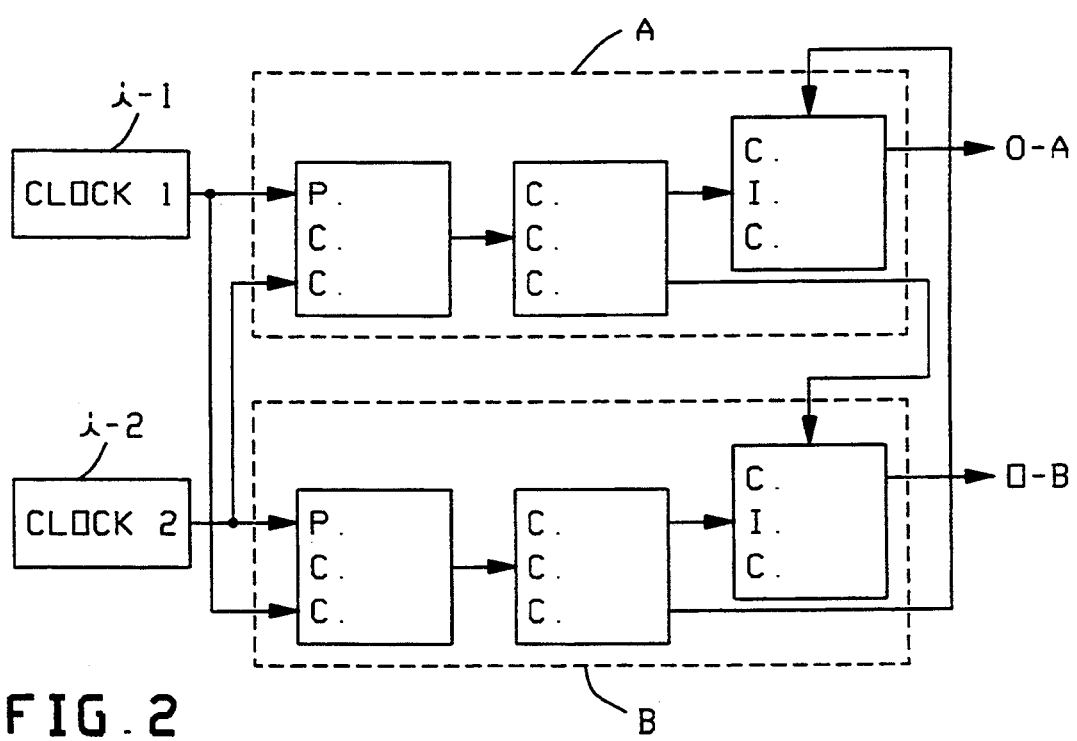
FIG. 2 is a like generalized diagram of a two-clock/-two-block switchover system according to this invention; that allows switchover repeatedly, in both directions.
Figure 3:
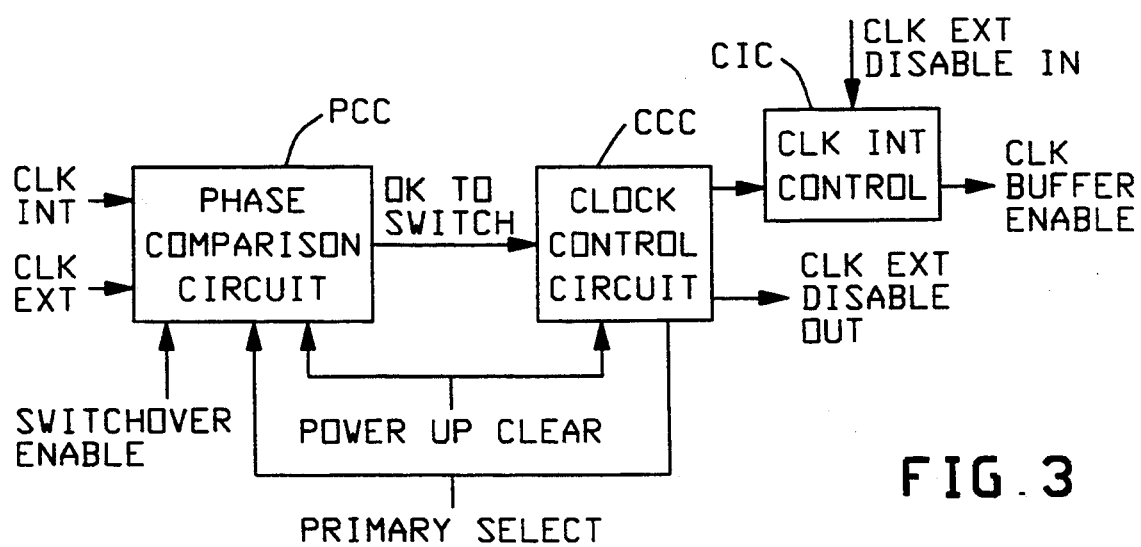
FIG. 3 is a more detailed functional diagram of one of the two (like) blocks in FIG. 2.

In General: FIGS. 2, 3 (details in FIGS. 4A, 4B):

FIG. 2 will give a general sense of this invention. Here, a pair of Switchover Circuits A, B are shown (e.g. each like FIG. 3), each consisting, essentially, of a Phase-Compare circuit PCC feeding a Clock-Control circuit CCC which, at proper times, and under control of a Clock-Internal Control circuit CIC, issues a respective clock-output-enable signal (cf. O-A, O-B). Each CCC is also coupled to (all other) companion CIC stages so as to apply "disable" signals thereto when its own CIC is enabled (at instant of switchover). Switchover is initiated upon detection of a prescribed "switchover event" (see below) and is executed upon detection of phase alignment.

Workers will appreciate that, in this fashion, one can switch over, from one clock to the other, any number of times and in either direction—yet without experiencing any "Halt Load" or like interruption, and without any resulting "downtime" or loss of program. [cf. whereas only one dynamic switchover circuit is necessary for switching in only one direction].

FIG. 3 illustrates a preferred Dynamic Clock Switchover embodiment (e.g. A or B in FIG. 2) in very schematic, general, block diagram fashion, expanding on FIG. 2.

Figure 5:
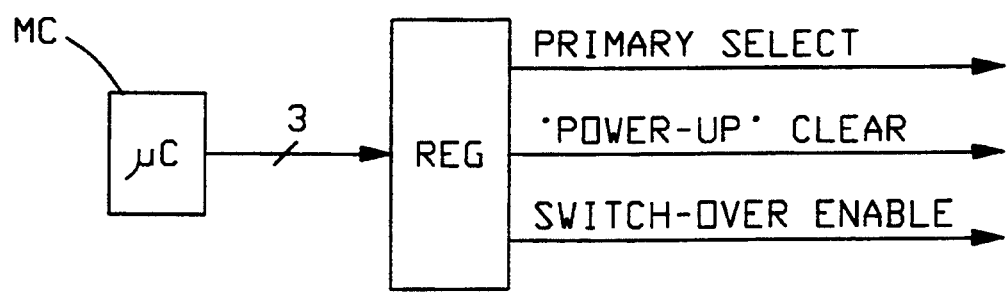
FIG. 5 diagrams a test circuit controlling inputs to FIGS. 4A, 4B.

Here, a "Phase Comparison Stage" PCC is arranged to received system clock signals; i.e. CLK INT from Backup clock card and CLK EXT from primary clock card; a "power-up-clear" signal (usually from associated system power logic; e.g. cf. associated microcontroller MC in FIG. 5), plus a "Primary Select" signal and a "Switchover Enable" signal. [here assume "CLK EXT" in FIG. 3 is the clock signal from the "primary", or operating, clock source, while "CLK INT" is the clock signal from the internal/backup source.]

Phase Comparison stage PCC is arranged and adapted to issue an "OK-to-Switch" signal (to its "Clock Control Stage" CCC) when the clocks are found to be properly "aligned".

Clock Control Stage CCC is arranged and adapted to also receive the same "Power-Up-Clear" and "Primary Select" signals and to issue a "CLK EXT DISABLE OUT" signal, as well as an "enable" signal (to a prescribed CLK INT CONTROL CIRCUIT CIC) when it receives an "OK-to-switch" signal.

Clock Internal Control Circuit CIC is arranged and adapted to issue a "CLK Buffer Enable" signal to turn its clock buffers ON or OFF and to receive a "CLK EXT Disable In" signal that will turn off its clock buffers when it has been designated the "primary" and clock switchover is occurring to the backup card.

Dual Switchover Circuit Operation (FIG. 3)

System Initialization

1) "Power-up clear" signal disables both the SCM board clock drivers (FIG. 4) by driving "CLK Buffer Enable" inactive.

2) The microcontroller (on each card shown in FIG. 2) initializes and establishes a low on "primary select" and a high on "switchover enable" outputs, before "power-up clear" goes high.

3) "Self-test" is run and a decision is made as to which card is designated "primary" and which is "secondary" (back-up).

4) The micro controller, on the card (clock) designated "primary", sets "primary select" high, enabling the system clocks on that board.

Switchover:

1) Switchover will be initiated upon detection by microprocessor of a "Switchover-Event" such as detection (by microprocessor) of a logic-fault or dropping of power on the clock card (or in the "primary cabinet" when 2+ cabinets/partitions are used—a "partition" will be understood as two systems in one cabinet—these "Events" being defined and detected according to the user's discretion and as known in the art; for instance, a controlling microprocessor may be set to disable power and thus initiate the Switchover when it detects some error condition).

2) Whereupon, the secondary micro-controller sets "switchover enable" Low, enabling the clock switchover operation by activating (its) Phase Compare stage PCC.

3) Thereafter, when the clocks are in proper "alignment" (or prescribed phase relation—phase relation being understood as depending on clock frequency and values of system components) the "primary clock" is disabled and the "secondary" clock enabled at the same instant. Preferably, "Primary" is disabled and "secondary" enabled during the "high port ion" of the clock pulse for a smooth transition.

Switching Back to "Primary"

1A) Thereafter, when the system perceives that the initiating "Switchover-Event" (Switchover-Condition) no longer prevails (e.g. logic fault cured, power then reapplied to Primary card/cabinet), this Switchover Circuit will automatically switch back to the "primary clock".

2A) To do this the "secondary clock" must first temporarily become the "primary". That is, first, the "primary select" on the "actual primary" gets set low, placing it in Back-up status. On the next clock of the "actual-primary" (which later becomes the "secondary"), "primary select" can be set high. The "former-secondary" clock is now the primary clock.

3A) Repeat steps #1 and #2 of "switchover" above, then repeat step #1A here, (i.e. "switching back to primary") to get the clocks back to the original primary.

Implementation in a Gate Array

Figure 4A:
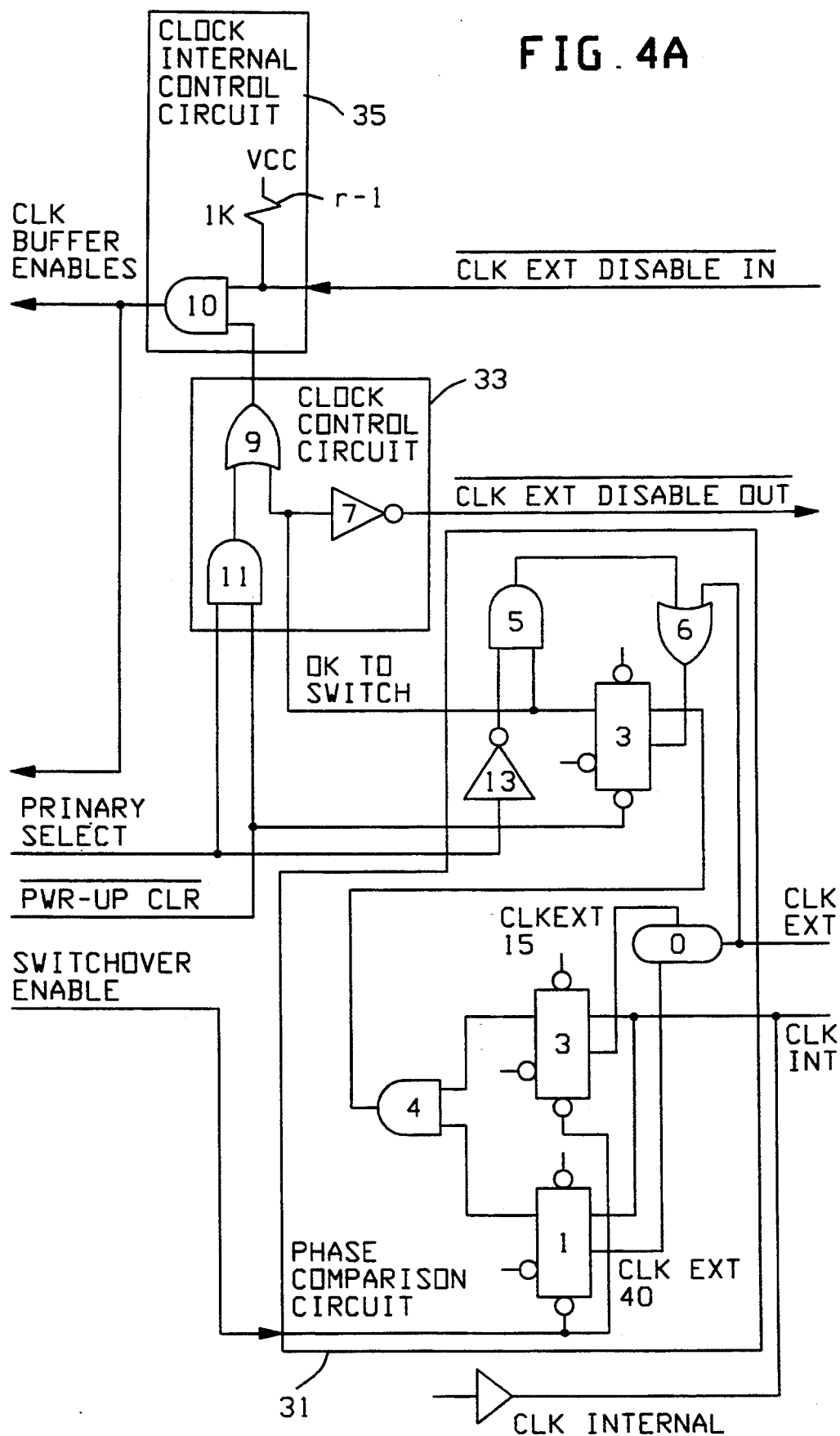

Because the circuit of FIG. 4A is here understood as implemented in a gate array, (except for delay line), test paths have been added to insure the functionality of the flip-flops. During test, Scan-1 is set high to select the SDI input; also Testmode-0 is set low to disable the "hold" feature on the Clock Control flip-flop. The Output of the last flip-flop can be read at the "Ck-Dis-Out" Output.

CLOCK SWITCHOVER CIRCUIT DIAGNOSTICS

Figure 4B:
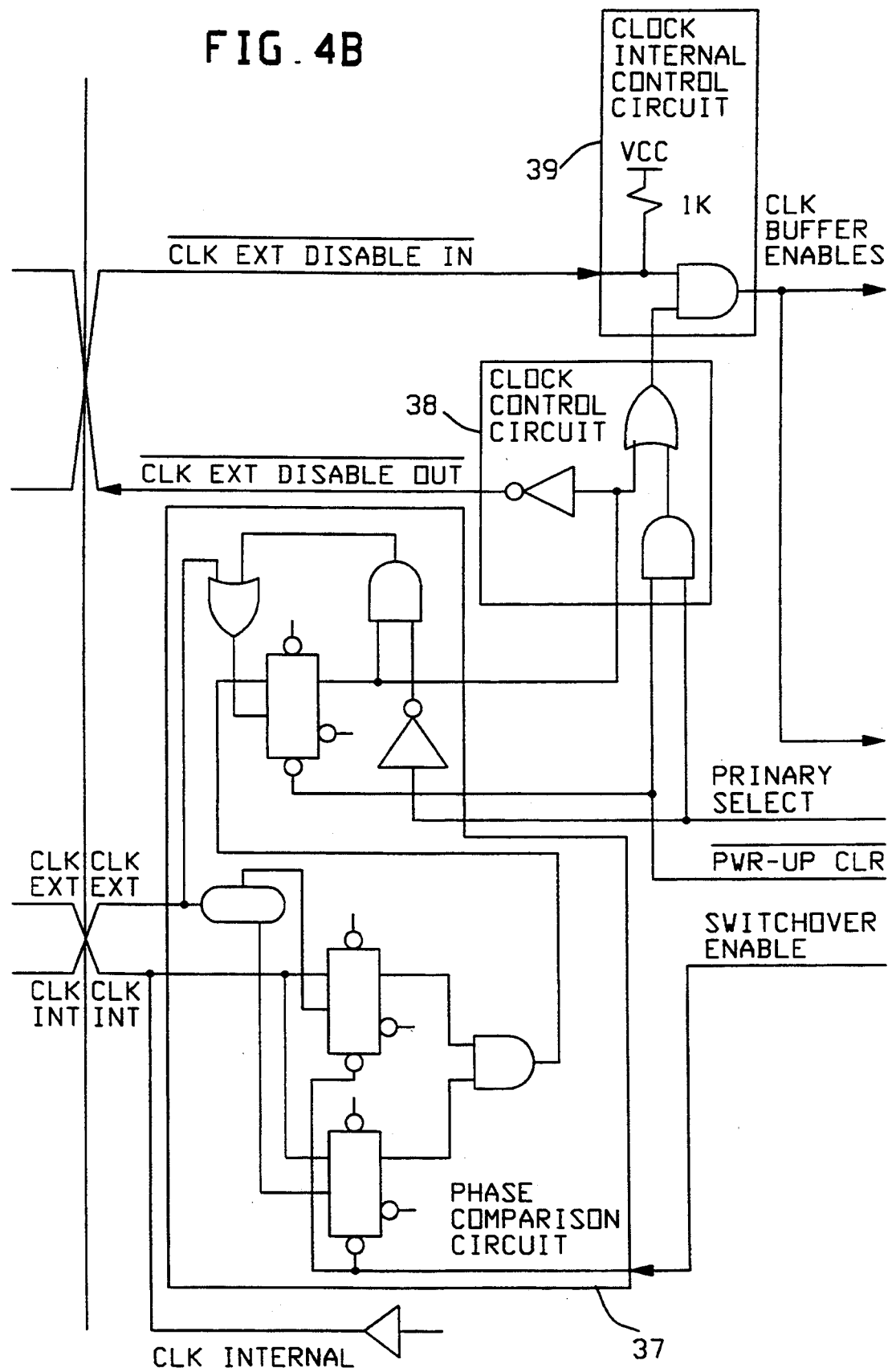

It will be understood here that a pair of Switchover Circuits (e.g. each as in FIG. 3) are to be connected in tandem as in FIGS. 4A, 4B. And, upon initialization, such a pair of clock switchover circuits, will be tested for functionality, i.e. by switching from one clock card to the other, and vice versa. To insure this capability, the circuit can be tested; e.g. with a test circuit as in FIG. 5. This test-control circuit is designed and operated to simulate commands from the micro-controller. The circuit is designed to operate continuously so that it can be observed using a real-time oscilloscope. FIG. 6 shows the associated command sequence. The test circuit "holds" until switchover occurs; then, once switchover is detected, commands are issued to switch back in the opposite direction.

Figure 7:
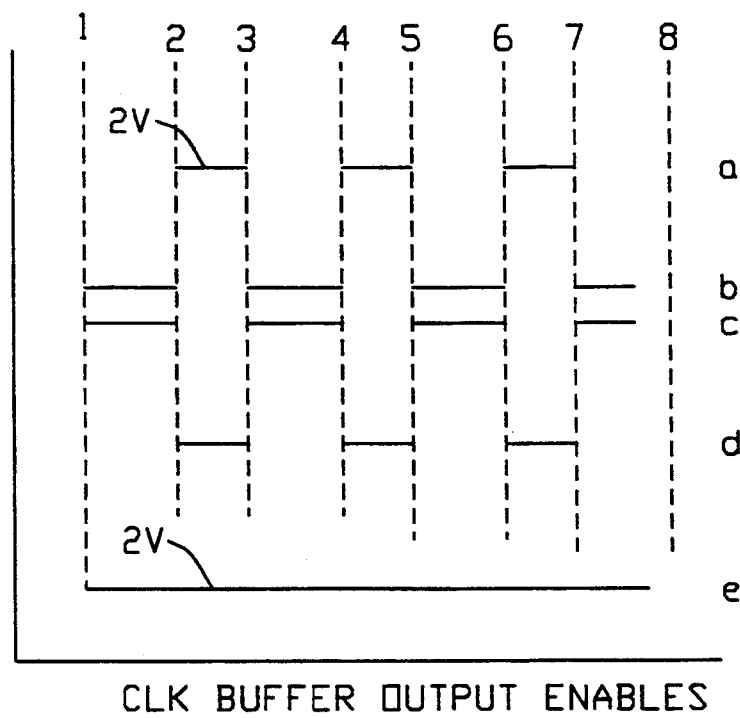
FIG. 7 shows typical "clock buffer output enables" for repeated switchover operation.

FIG. 7 shows associated clock buffer "output enables" for cards 1 and 2 (operated at room temperature). These are opposite logic levels, with switching as expected. Switchover time will vary depending on how close the oscillator frequencies are to one another.

detail; of FIGS. 4A, 4B:

FIGS. 4A, 4B illustrate a preferred implementation of this FIG. 2, FIG. 3 system, (with like parts identically labeled), with a like preferred clock switchover CKT indicated on each of the two respective cards (Primary CLK on Card 1, Backup on Card 2). Here, the system will be understood as implemented in a CMOS gate array chip which has self-diagnostic features added. The operational description given here assumes the use of discrete IC logic, but without diagnostics, (for simplicity). Note Primary Card 1 with PCC 37, CCC 38 and CIC 39; Back-up card 2 with PCC 31, CCC 33 and CIC 35.

Since the two cards are essentially identical, only card #2 will be elaborated. CIC circuit 35 includes an AND gate 10 fed by output from CC circuit 33 and an external disable line (comprising voltage source VCC and pull-up resistor r-1). CC circuit 33 comprises an AND gate 11 fed by "Primary Select" and "POWER-UP Clear" signals, plus an OR gate 9 fed by output from gate 11 and by output from PC circuit 31. PC circuit 31 comprises a pair of phase-comparison flip-flops 1, 2, feeding an associated AND gate 4 which, in turn, feeds a storage flip flop 3. (flip flops 1, 2, 3 are all D-Type, with individual "clock" and "clear"). Non-inverted output from FF3 is fed to CC circuit 33 as well as to AND gate 5 (along with the inverse of "Primary Select" via inverter 13). AND gate 5 inputs OR gate 6 along with "External Clock". Output from delay line 0 inputs FF2 and is adapted to control clock frequency. Inverter gate 13 inverts "Primary Select" input, while inverter gate 7 inverts the "OK to switch" signal.

Operation of FIGS. 4A, 4B:

First, after "Power-up", the "Power Up Clear" signal goes low- This clears the Phase Comparison Circuit output (FF #3 in PCC 31, FIG. 4A) to a low, and prevents a (yet-undetermined) Primary Select input (AND gate 11) from propagating through gates 9 and 10, to enable the clock buffers. [avoids a "bus contention" problem]. After system stabilization, the "Power Up Clear" signal goes high, enabling AND gate 10 for "Primary Select" to occur.

Next, "Primary Select" is set high on the designated primary clock card (cf. PCC 37, CCC 38), enabling its clocks. "Primary Select" remains low on the designated backup clock card. (going to PCC 31, CCC 33).

CLOCK SWITHOVER

Phase Comparison Circuit (PCC)

Upon detection of a "Switchover Event" (see above), a controller (e.g. preferably microprocessor or microcontroller, etc.) sets "Switchover Enable" high on the backup clock card, enabling the phase comparison with "D" Flip-Flops 1 & 2, (FIG. 4A).

The Primary clock source (Clock External, see CLK EXT, FIG. 3) and Backup clock source (Clock Internal) are checked for phase relationship. The Ext Clk is delayed by a delay stage (see delay line 0, FIG. 4A) by two different amounts, each one clocking a respective one of flip flops 1 & 2. When both 1 and 2 are high, "phase alignment" is "acceptable"; so AND gate 4 goes high, and this is registered on the next Ext Clk in FF 3. The registered high output is ANDed at 5, with the "high" inputted from the inverted-Low of "Primary Select". This "high" goes to OR gate 6 which prevents further clocking of the register flip-flop 3.

Clock Control Circuit (CCC, 33)

At the same time, the output high of FF3 (called "OK to Switch") goes to the clock control circuit CCC(33) which inverts it and sends out a low on Clk Ext Disable Out line. This signal goes to the primary clock card's internal control circuit 39 and disables (tristates) the clock buffers while in a high output state. The clock buffers are terminated with a "pull-up" (or split termination) and so remain in a high output state when tristated. This is done by causing the output of AND gate 8 in CIC 39 to go low. The other input to AND gate 8 (from CCC 38) is high.

And, at the same time, the "OK to Switch" signal goes to the OR gate 9 input where it causes the output to go high. The other input to OR gate 9 is Low.

Clock Internal Control Circuit (CIC, 35)

This high from gate 9 goes to AND gate 10 whose other input is high. The output of AND gate 10 goes high, enabling the clock buffers, which now go from a tristate condition to a high logic level. (Clock inputs are still high.) The clocks are now completely switched to Backup Card #2 (FIG. 4A).

SWITCHING BACK TO PRIMARY

It is possible to switch clocks from the backup card (cf. Card 2, FIG. 4A) back to the primary card (Card 1, FIG. 4B). First, the "Switchover Enable" signal is set low on the Backup Card (FIG. 4A), clearing FF's 1 & 2 and causing the output of AND gate 4 to go low.

"Primary Select" on primary card #1 gets set low, throwing it into "backup" status. Then, "Primary Select" on the backup card (#2, FIG. 4A) is set high, and so converts card-2 into the "Primary" card. When "Primary Select" thus goes high, it propagates through AND gate 11 to OR gate 9 this keeping the output of OR gate 9 high, and thus keeping the clock buffers enabled through AND gate 10.

As this occurs, the "Primary Select" high is inverted, causing the output of AND gate 5 to go low. This allows "Clk Ext" to go through OR gate 6 to FF 3. Since the output of AND gate 4 is low, the next clock to FF 3 will cause the output to go low. This will go to OR gate 9 where it will have no effect since "Primary Select" is already high.

To switch back to the original primary card (Card #1, FIG. 4B,) the sequence of clock switchover and switchback (to primary) is repeated. This time, the original (primary) card is the "backup" card.

Figure 4C:
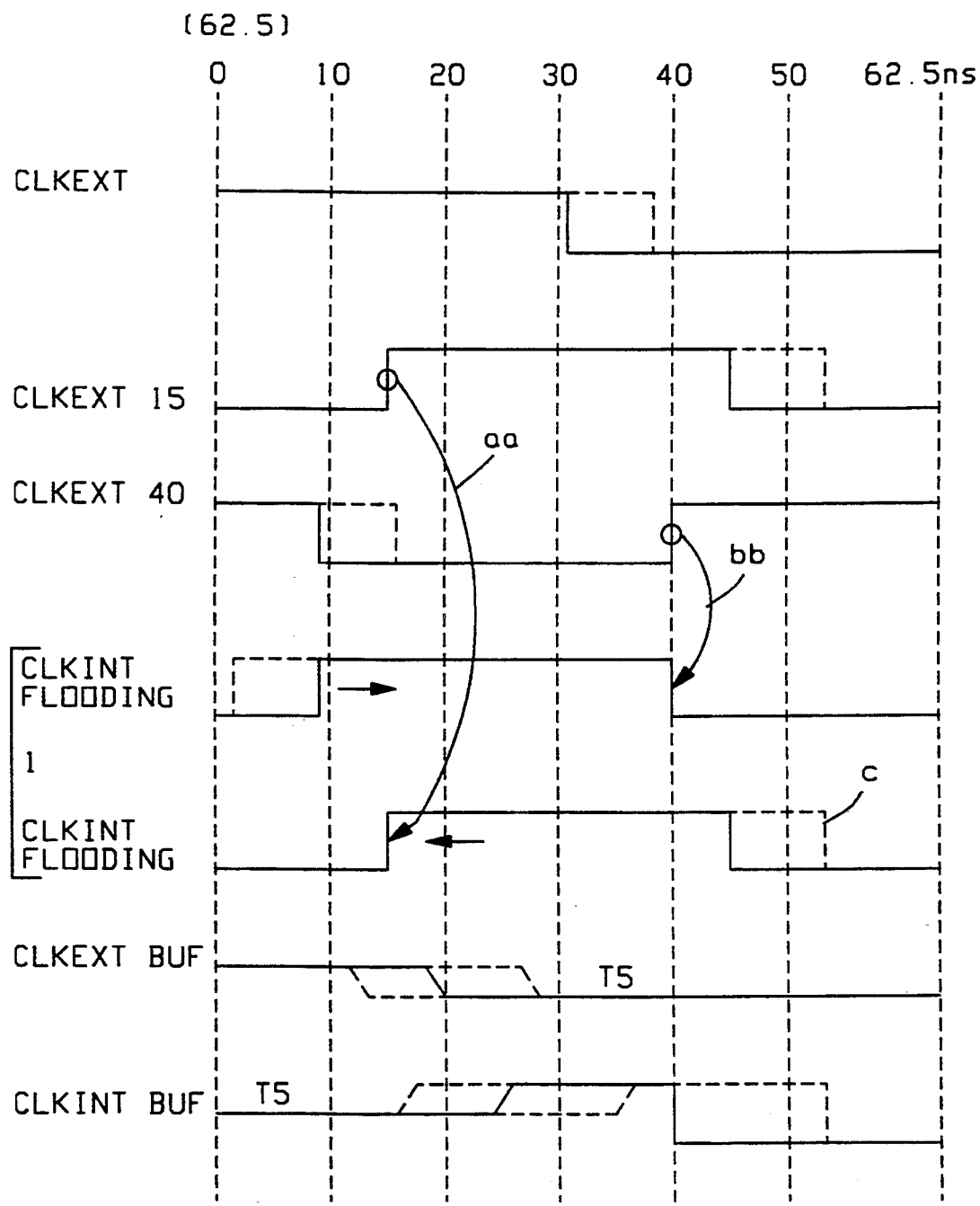
FIG. 4C is an associated Timing Diagram.

FIG. 4-C is a Timing diagram to illustrate typical time relations, for a 16 MHz clock, between the signals in FIGS. 4A-4B, as implemented on a clock gate array chip. [note, "acceptable alignment" extremes are labeled aa, bb, respectively].

Note that, because of delay line tolerance and register setup time variance, the CLKINT signal could go high as late as 17 ns, and could go low as early as 36.5 ns. The CLKINT enable delay must therefore fall between 17 ns. to 36.5 ns. The CLKEXT delay can be anywhere from 0 to 31.5 ns.

Workers will note the efficiency of each dynamic switchover circuit (FIGS. 4A, 4B), each requiring only one resistor (r-1), one delay line (cf. 0), two inverter gates (cf. 7, 13), two OR gates (cf. 6, 9), four AND gates (cf. 4, 5, 10, 11) and three D-flip-flops (cf. 1, 2, 3; each with individual "clock" and "clear").

DYNAMIC CLOCK SWITCHOVER CIRCUIT—SUGGESTED MODIFICATIONS

The Dynamic Clock Switchover Circuits described above will be understood as an implementation for a 2-clock system. Each includes a back-up clock generation card for switching clocks from a primary card to itself when given the switchover command. It will also switch clocks back to the primary when given the indicated command sequence (e.g. see FIG. 6).

However, workers will appreciate that such arrangements can be adapted to monitor any number of clocks by adding additional "phase comparison stages", to switch from any of those clocks to itself, or (with slight modification) from itself to any of those clocks.

The upper limit of clock frequency that can be monitored is determined by the logic used in the Dynamic Clock Switchover Circuit. (This application was for 16 MHz implemented in a CMOS gate array.) There is theoretically no lower frequency limit.

Conclusion

It will be understood that the preferred embodiments described herein are only exemplary and illustrative, and that the invention is capable of many modifications and variations in construction, arrangement and use, without departing from the spirit of what is claimed.

For example, the means and methods disclosed herein are also somewhat applicable to other related computer systems and associated timing circuits. And, this invention is applicable for clock cards for other like systems.

Accordingly, the present invention should be considered as encompassing all possible modifications and variations coming within the scope of the following appended claims.

What is claimed is:

1. In a computer system, an arrangement for automatically, bilaterally switching between a first clock generating unit providing clock output and a second independent auxiliary clock generating unit providing clock output upon occurrence of a switchover-event, said arrangement comprising:

first and second dynamic switchover means, each said dynamic switchover means coupled to said first and second clock generating unit respectively and to receive said clock output from the other one of said dynamic switchover means and for passing an associated version of the clock output to common utilization means;

each of said dynamic switchover means comprising:

compare means coupled to receive said two clock signals from said first and second clock generating units respectively, a switchover-enable signal, a primary select signal, and a power-up clear signal, responsive to said switchover-enable signal, said primary select signal, and said power-up clear signal in a selected state, for generating a switchover signal upon detecting alignment of said two clock signals; and microprocessor control means, coupled to receive said switchover signal, said primary select signal, said power-up clear signal, and a disable signal from said other one of said dynamic switchover means, for generating a switch enable signal to enable said clock output of said respective clock generating unit and for generating a disable signal to inhibit the clock output of said other one of said clock generating units.

2. The invention of claim 1 wherein each said control means includes a clock-internal-control stage coupled to receive the output of a said compare means and adapted to output switchover-initiating signals (S-C) responsive to receipt of a prescribed disable signal (DS) indicating occurrance of said "switchover event."

3. The invention of claim 2 wherein said clock-internal-control-stage includes buffer storage means.

4. The invention of claim 2 wherein each said compare means is adapted to output a prescribed enable signal (e) upon detecting phase alignment of its clock signals with other clock signals.

5. The invention of claim 1 wherein each said control means is adapted to output clock-enable/switchover-initiating signals; and wherein each said compare means is adapted to output a prescribed enable signal (e) upon detecting phase alignment of its clock signals with other clock signals.

6. The invention of claim 5 wherein each said control means includes a clock-internal-control stage coupled to receive the output of a said compare means and adapted to output switchover-initiating signals (S-C) responsive to receipt of a prescribed disable signal (DS) indicating occurrance of said "switchover event."

7. The invention of claim 6 wherein said clock-internal-control-stage includes buffer storage means.

8. The invention of claim 7 wherein each said clock-internal-control stage is coupled to receive the output of all such clock-control stages and adapted to allow output of such switchover-initiating signals s-i responsive to receipt of a prescribed disable signal indicating occurrance of said switchover event.

9. The invention of claim 8 wherein each said compare means includes a pair of phase-comparing flip flops feeding a logic circuit including a storage flip flop, plus delay means coupled to a phase-comparing flip-flop and adapted to control clock frequency.

10. The invention of claim 9 wherein each said control means is coupled to receive the output O-S from said storage flip flop, being adapted to AND "Primary Select" and Power-Up Clear" signals and OR the resultant output of so ANDing said signals with the said output O-S from said storage flip flop.

11. In a computer system, an arrangement for automatically switching among a primary clock generating means providing a first output, and N auxiliary independent clock generating means each providing an output, upon occurrence of a prescribed switchover event, said outputs from all said clock generating means not being phase synchronized, said arrangement comprising:

N+1 dynamic switchover means, each of said dynamic switchover means coupled to a different one of said clock generating means, each said dynamic switchover means further comprising:

input phase compare means, which is coupled to receive the outputs from said primary clock generating means and said N clock generating means, and which, responsive to receipt of a prescribed disable signal indicating occurrence of said switchover event, output an enable signal upon detection of alignment of the phase of clock signals output from said N clock generating means with those of said primary clock generating means;

clock control means, coupled at the output of said phase compare means, for outputting a clock output enable signal and a switchover-initiating signal; and clock internal control means which includes microprocessor means and clock buffer means, said clock-internal control means being coupled to receive the outputs of all said clock control means, and being responsive to said clock output enable signal, for enabling the output from the coupled clock generating means and for outputting said switchover-initiating signal to said all other dynamic switchover means to disable said outputs from said all other clock generating means.

12. An arrangement for automatically, bilaterally switching between a first clock generating unit and a second independent auxiliary clock generating unit, said arrangement comprising:

first and second dynamic switchover means, each said dynamic switchover means coupled to respective clock generating unit and to receive output from the other one of said dynamic switchover means and for passing an associated version of a respective output to common utilization means;

each of said dynamic switchover means comprising:

compare means coupled to receive two clock signals from said first and second clock generating units respectively, a switchover-enable signal, a primary select signal, and a power-up clear signal, responsive to said switchover-enable signal, said primary select signal, and said power-up clear signal in a selected state, for generating a switchover signal upon detecting alignment of said two clock signals; and microprocessor control means coupled to receive said switchover signal, said primary select signal, said power-up clear signal, and a disk, able signal from other one of said dynamic switchover means, for generating switch enable signal to enable output of said respective clock generating unit and for generating a disable signal to inhibit the output of other one of said clock generating units.

* * * * *